(12) United States Patent
Komsitsky et al.

(10) Patent No.: US 8,303,227 B2
(45) Date of Patent: Nov. 6, 2012

(54) LINING FASTENERS AND METHODS AND APPARATUS THEREFOR

(75) Inventors: Igor Komsitsky, Los Angeles, CA (US); Javier Torres, Hacienda Heights, CA (US)

(73) Assignee: The Monadnock Company, City of Industry, CA (US)

( * ) Notice: Subject to any disclaimer, the term of this patent is extended or adjusted under 35 U.S.C. 154(b) by 308 days.

(21) Appl. No.: 12/246,490

(22) Filed: Oct. 6, 2008

(65) Prior Publication Data

US 2010/0083471 A1    Apr. 8, 2010

(51) Int. Cl.
*F16B 15/00* (2006.01)
(52) U.S. Cl. ........................................ 411/477; 411/450
(58) Field of Classification Search ................... 411/477, 411/478, 479, 388, 451, 466, 468, 472, 451.1, 411/480
See application file for complete search history.

(56) References Cited

U.S. PATENT DOCUMENTS

| | | | |
|---|---|---|---|
| 1,087,580 A * | 2/1914 | Hamill | 411/477 |
| 2,197,220 A | 4/1940 | Kost | |
| 2,202,896 A * | 6/1940 | Buchner et al. | 446/392 |
| 2,553,917 A | 5/1951 | Hartman | |
| 2,560,961 A | 7/1951 | Knohl | |
| 2,797,605 A | 7/1957 | Metze | |
| 2,876,971 A | 3/1959 | Poupitch | |
| 3,738,217 A * | 6/1973 | Walker | 411/510 |
| 3,983,779 A * | 10/1976 | Dimas | 411/447 |
| 4,075,924 A | 2/1978 | McSherry et al. | |
| 4,203,193 A * | 5/1980 | Arthur | 29/525.03 |
| 4,289,058 A * | 9/1981 | Paskert | 411/456 |
| 4,370,840 A * | 2/1983 | Bisbee et al. | 52/410 |
| 4,597,702 A * | 7/1986 | Brown | 411/529 |
| 4,739,955 A | 4/1988 | Aquino et al. | |
| 4,805,366 A * | 2/1989 | Long | 52/309.11 |
| 5,518,215 A * | 5/1996 | Lyons | 248/309.2 |
| 6,022,351 A | 2/2000 | Bremer et al. | |
| 6,276,644 B1 * | 8/2001 | Jennings et al. | 248/49 |
| 6,659,700 B1 * | 12/2003 | Farrell et al. | 411/450 |
| 7,658,583 B2 * | 2/2010 | Homner | 411/510 |

FOREIGN PATENT DOCUMENTS

GB          635670 A    4/1950

OTHER PUBLICATIONS

Jeong, Kyong Hun; PCT International Search Report; WIPO Korea ISA; May 20, 2010; PCT/US2009/059750 & WO2010042558A2.

* cited by examiner

*Primary Examiner* — Gary Estremsky
(74) *Attorney, Agent, or Firm* — Henricks, Slavin & Holmes LLP

(57) ABSTRACT

Fastener assemblies, elements for fastener assemblies and methods of making and assembling elements for fastener assemblies, for example for insulation blanket fasteners such as those used on aircraft, may include a formed monolithic metal configuration having first and second side portions with a plurality of panel retaining elements arranged linearly along the side portions. A planar retaining element, for example a disc, may be assembled with the metal portion to form a fastener assembly, such as may be used to retain and insulation blanket. The planar retaining element may include a rolled edge, and if a coated part, may include surface projections to keep adjacent parts from sticking together during the coating process.

21 Claims, 10 Drawing Sheets

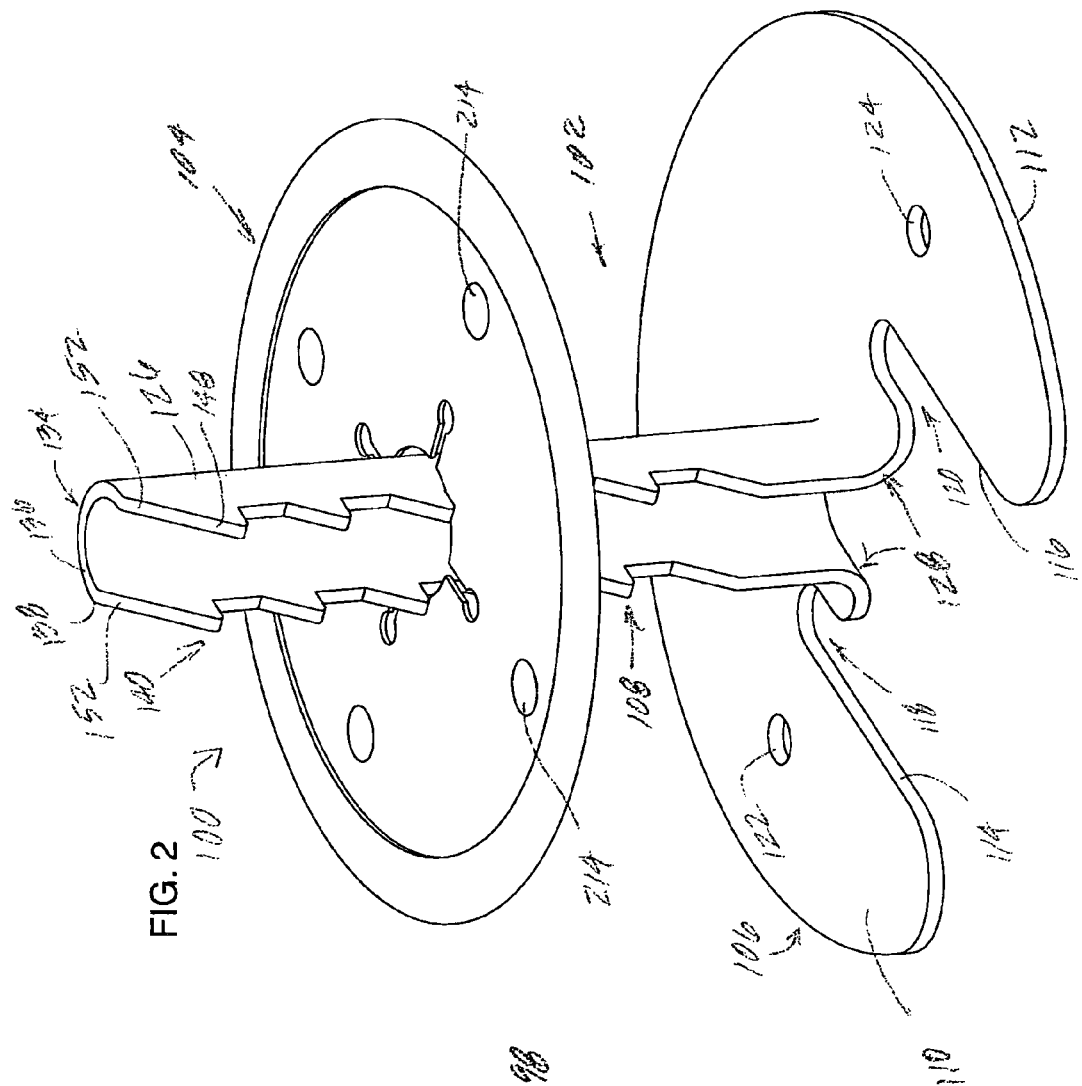

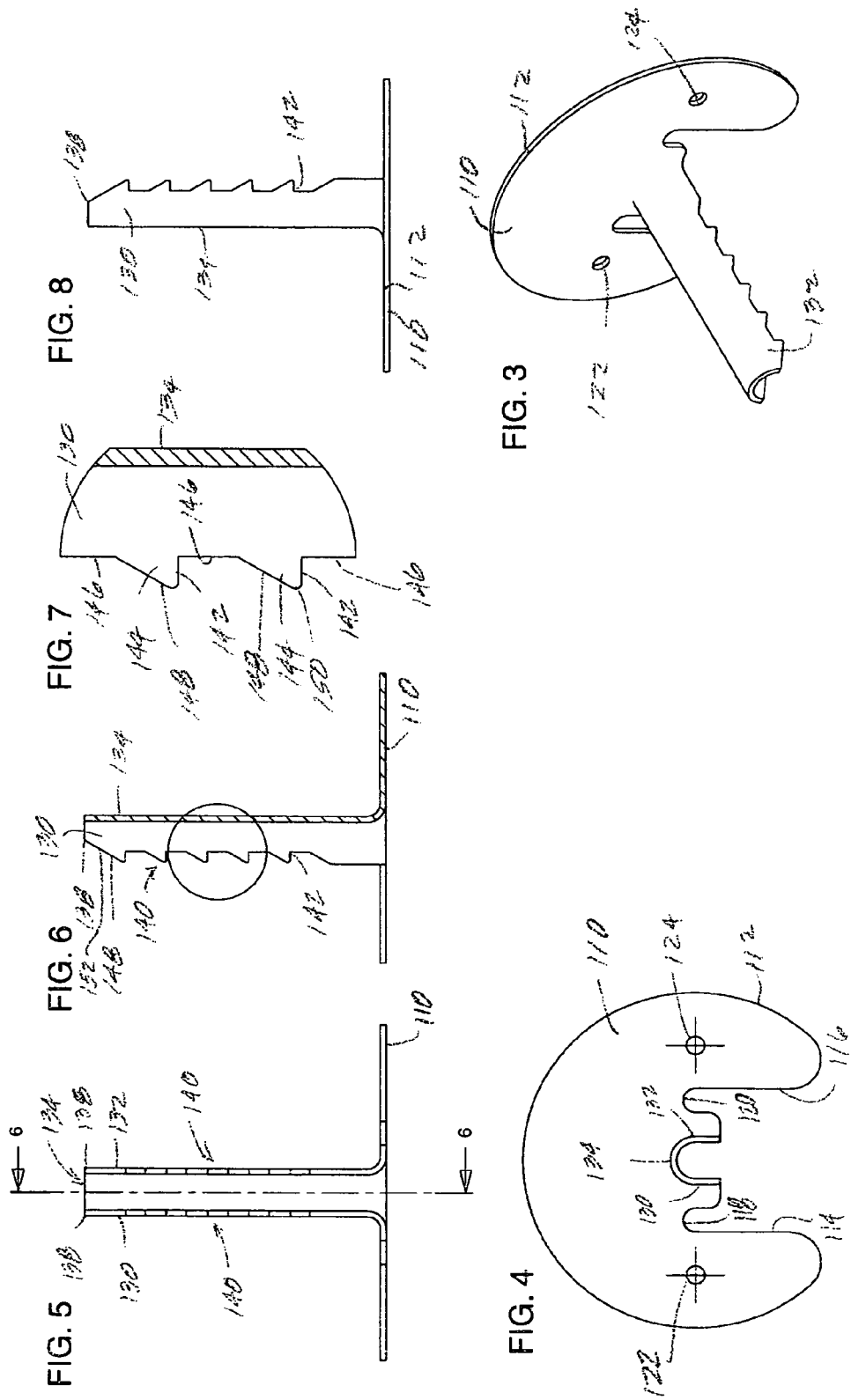

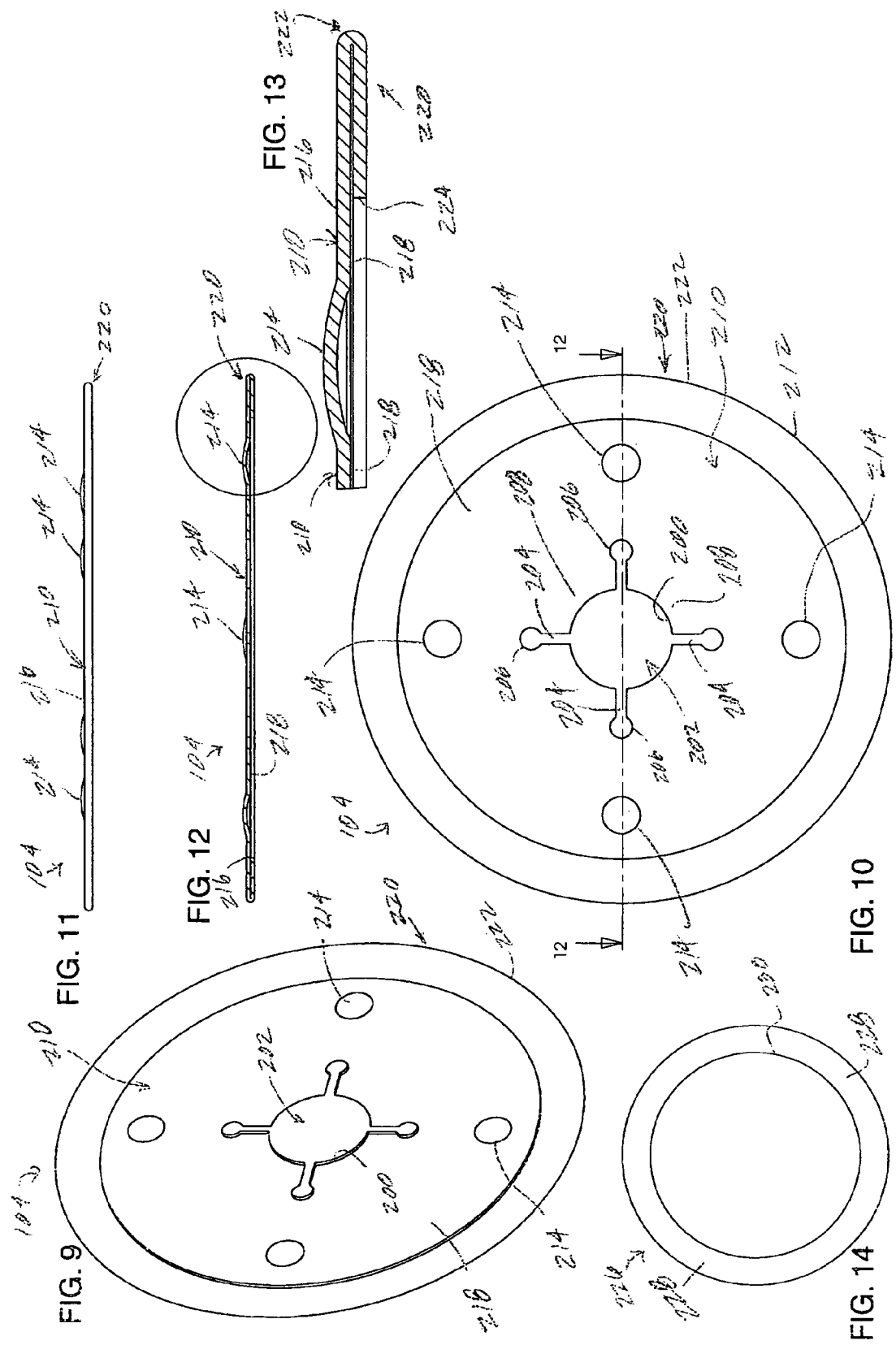

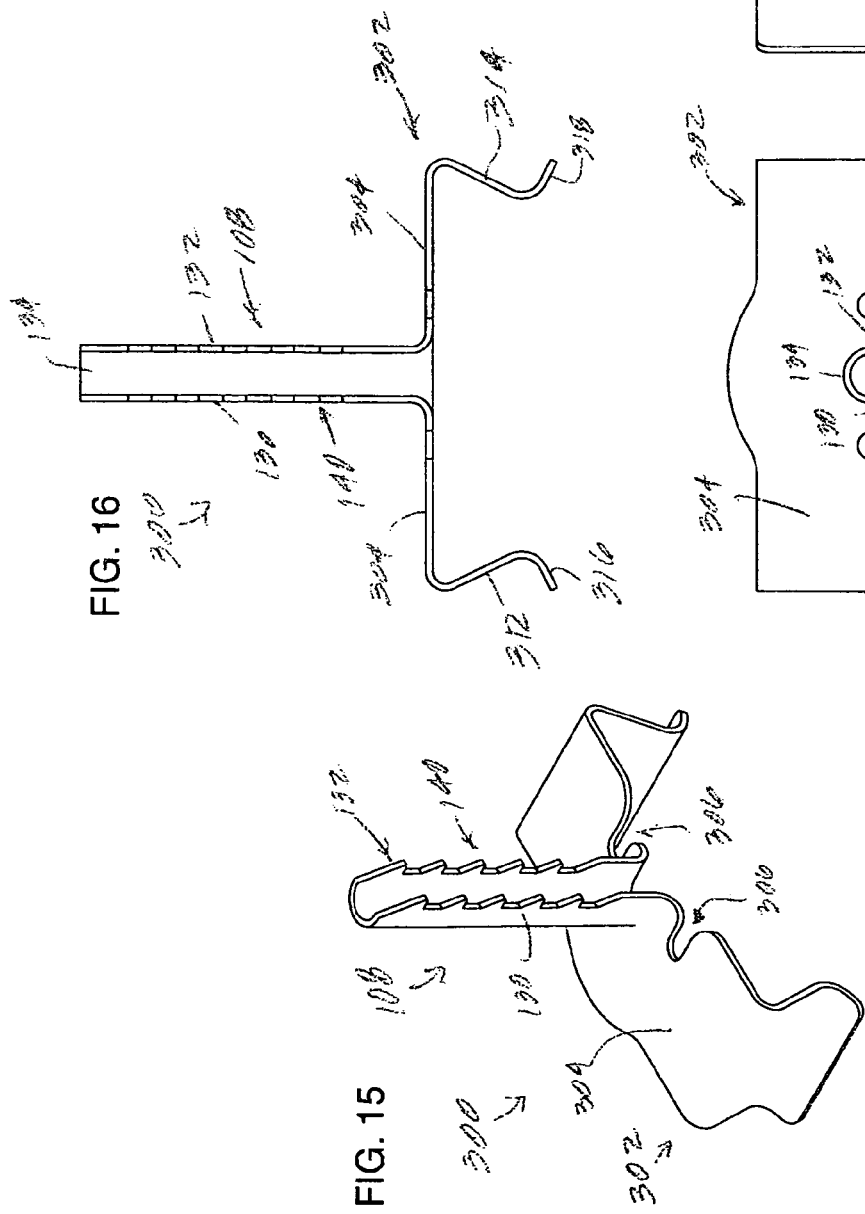

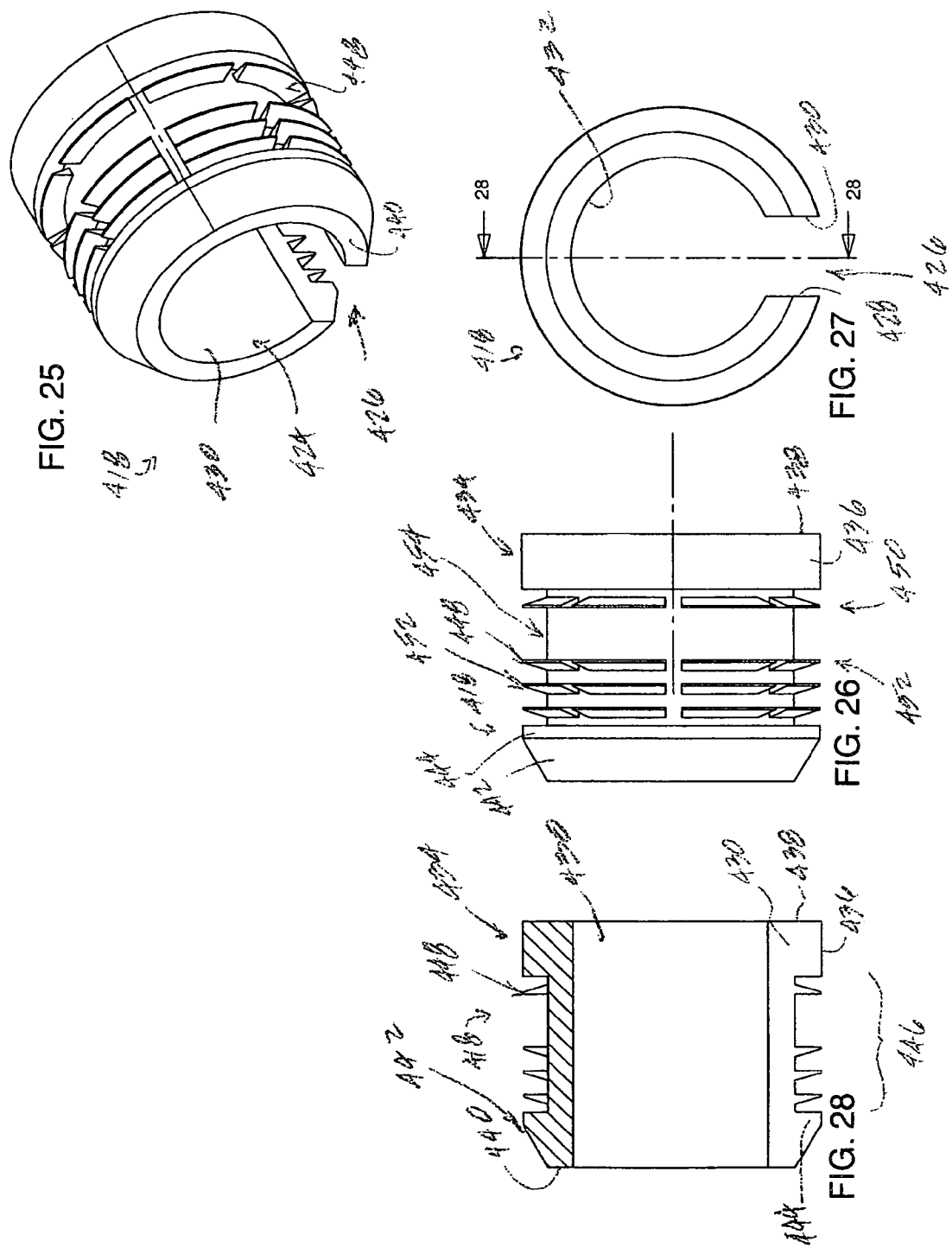

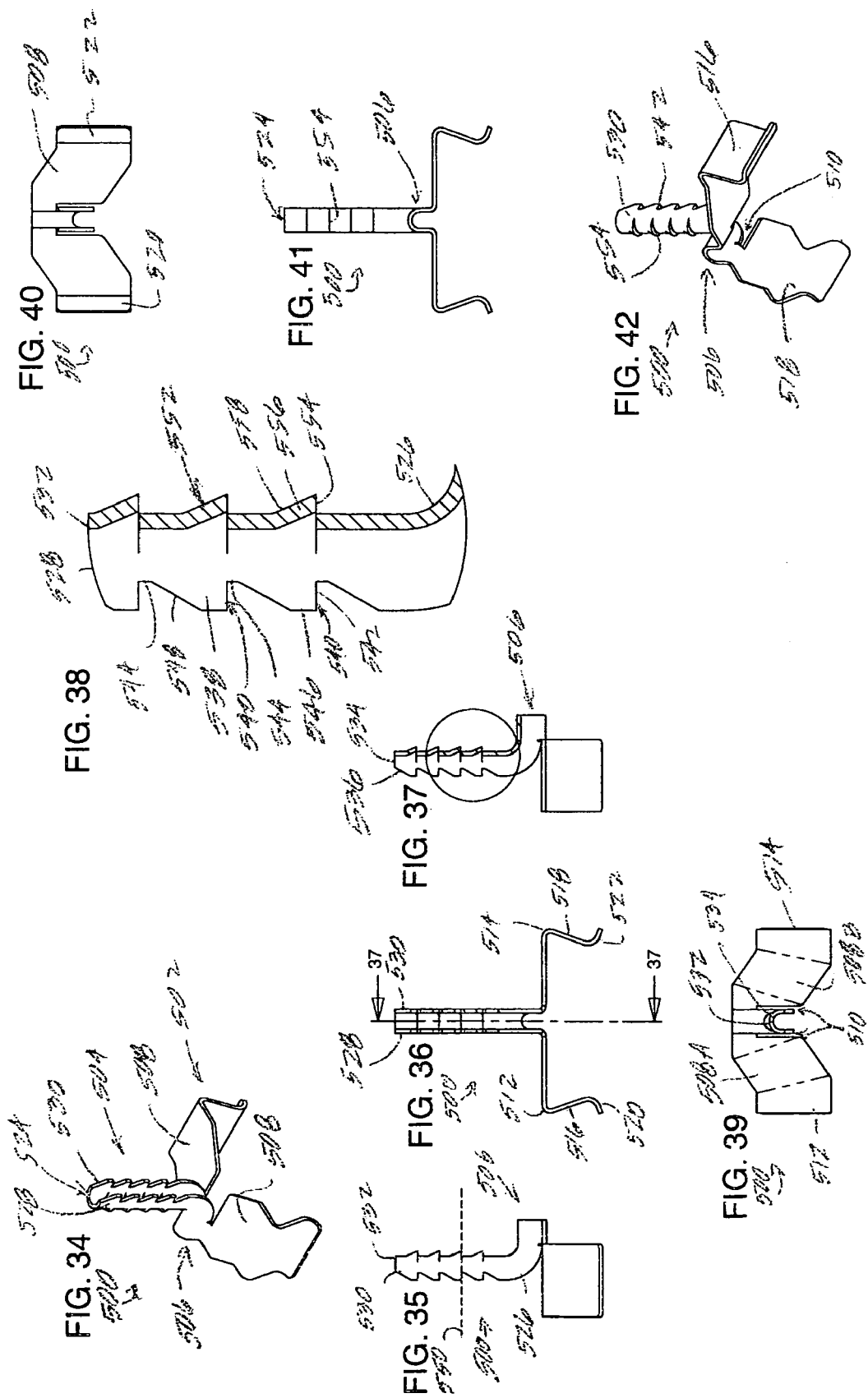

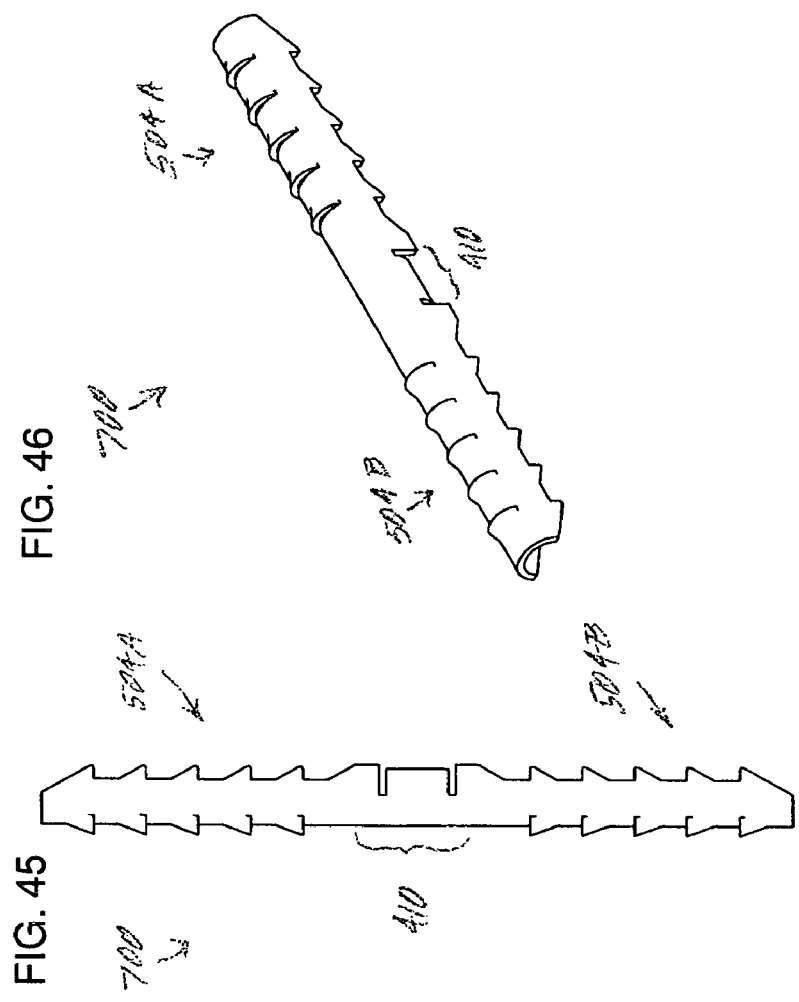
FIG. 46
FIG. 45
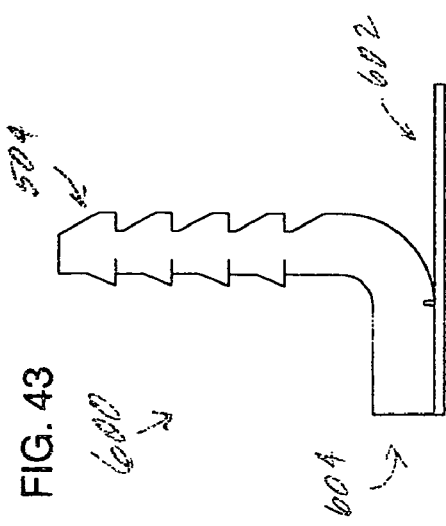
FIG. 43
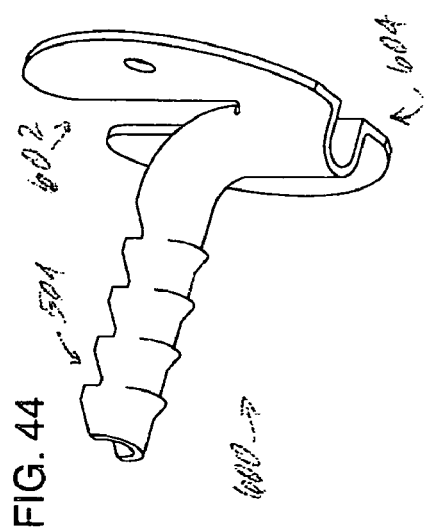
FIG. 44

LINING FASTENERS AND METHODS AND APPARATUS THEREFOR

BACKGROUND

1. Field

These inventions relate to lining fasteners, including for example insulation blanket fasteners, insulation blanket fasteners for aircraft, and including for example apparatus and methods of making and using lining fasteners.

2. Related Art

In many aircraft, body portions such as the fuselage, passenger areas and/or cargo areas are lined with insulation panels and/or blankets. The panels are held in place with a plurality of fastener assemblies that are riveted, adhered or otherwise fixed to a fuselage structure such as a beam, stringers, frames or the like. Example fastener assemblies are molded from nylon or other plastic materials, and typically include a disc and a fastener stud having a base portion and a barb, where the barb may be used to puncture the blanket, for example. The barb typically includes a plurality of circumferential ridges or catches for engaging an opening in the disc placed over the barb. The plurality of ridges allows the disc to be placed at one of a number of axial positions along the barb as a function of the insulation panel thickness. For example, pressing the disc onto a barb past a given ridge on the barb may serve to hold the insulation panel in place, but further pressing the disc against the insulation panel may move the disc further along the barb and under another, further ridge for holding the insulation panel in place.

The fastener stud can be supported from the base portion on a portion of the fuselage, on a stringer, on a frame stud, or the like. The configuration of the base portion is generally formed to accommodate the profile of the underlying support structure.

SUMMARY

A fastener assembly, a fastener and a disc for a fastener assembly, for example for blanket insulations for aircraft, can be made more reliably, more easily and with a longer lifespan, even under adverse conditions. In some examples of such apparatus, the fasteners and/or the discs can be formed from metals, each may be formed as a monolithic metallic structure, and each may be installed as easily as conventional structures. Several examples of such structures are described herein, and examples of methods of manufacturing and using such exemplary structures are also described.

In one example, a fastener stud, for example one for a blanket insulation fastener assembly, is a metal fastener element having a linear element such as a post element and a support structure for supporting the linear element on an underlying support. In one example, the linear element includes first and second side portions, at least one of which has a plurality of disc retaining elements arranged linearly along the linear element. In other examples, the disc retaining elements may be stop surfaces, knurls, flanges, shoulder surfaces, teeth, catches or other surfaces for reliably limiting the movement of a disc on the linear element away from the support structure. In a further example, both side portions include disc retaining elements, and in another example, each side portion includes a disc retaining element at a given distance from the support surface. In another example, at least one side portion has at least as many of the disc retaining elements as the other side portion, and in a further example has the same number. In one example of the disc retaining elements, at least one includes a substantially flat surface substantially parallel to a portion of the support surface or to a portion of a base supporting the linear element. In another example, a disc retaining element has a ramp surface extending from a flat surface away from a base of the fastener, and in a further example each disc retaining element is spaced apart from an adjacent disc retaining element.

In a number of examples of fastener elements, for example ones for a blanket insulation fastener assembly, the fastener element includes a base having a substantially flat perimeter portion. In another example of such a fastener element, the base may include a raised or riser portion between a perimeter portion of the base and a linear element of the fastener. In another example, a base may include a linear support portion and an angled or clip portion for supporting the base and limiting movement of the base relative to a support structure, for example a support structure such as a stringer, I-beam, T-beam, L-beam or other engagable profile. In a further example, a fastener element may be a linear element where the support is a sleeve or boss on the linear element and the sleeve or boss is configured to engage the support structure. Where the linear element is a through stud for example, the support can be a sleeve or grommet around part of the stud for engaging the supporting structure, such as when the fastener and sleeve are inserted into or through a stringer or structural beam. The through stud or other linear element can have a semi-circular or fully circular interface structure on which the sleeve rests.

In a number of examples of fastener elements, for example ones for a blanket insulation fastener assembly, the fastener element may include a linear element having a substantially U-shaped element, such as a post element, stud element, linear element or other axially-extending structure. In further examples, the fastener element may include teeth, or other disc retaining structures such as those described herein, such as may extend from the U-shaped element edge surfaces. The teeth or other structures may be supported by a curved bridge portion, and in one example, the curved bridge portion may be substantially semi-circular. The bridge portion, or other structure between the disc retaining elements, may include one or more of its own elements to help retain a disc for the fastener assembly. For example, the bridge portion may include teeth or other projections extending from the outer surface of the bridge portion, such as may be created by punching material forming part of the bridge portion. In some examples, the bridge portion can have the same number of teeth (or other projections) as the number of teeth (or other projections) on each of the other surfaces of the linear element. In some examples, each of the teeth or other projections at a given axial position or height on the linear element can be positioned at approximately 120°, or for example equidistant, from adjacent teeth.

In a number of examples, fastener studs such as for blanket insulation fastener assemblies may be formed as monolithic structures. For example, they may be easily stamped or cut from sheet metal and formed into the desired shape. The final structure has significant strength and reliability under expected operating conditions, and is relatively easy to manufacture. A number of fastener stud configurations can be formed in this way.

In another example, a fastener stud, for example for a blanket insulation fastener assembly, is formed as a monolithic metal fastener stud having a base and a post element. The post element includes first and second side portions spaced apart from each other and having respective stops or retaining surfaces for keeping in place insulation retaining elements, for example retaining discs. In one configuration, each stop on a first side of the post element includes a corresponding stop on the second side portion, and the corresponding stops are substantially equidistant from a surface of the base. In such a configuration, a disc retained on the fastener stud can be positioned approximately parallel to the base.

In a further example, a fastener stud, for example for a blanket insulation fastener assembly, can be formed with a post element having first and second sets of stops or retaining surfaces for insulation retaining elements on exposed edge surfaces of the post element, as well as additional stops or retaining surfaces intermediate the first and second sets. For example, the first and second sets of stops may be on the exposed edge surfaces of a U-shaped post element and additional stops may be placed on a curved portion of the U-shaped post element. In one configuration, corresponding sets of stops are formed on their respective surfaces at the same axial position along the post element. In another configuration, corresponding sets of stops may include corresponding stop surfaces, for example facing in a direction substantially parallel to an axis of the post element, and also such stop surfaces may be flat or may take other configurations such as to conform to a surface of a blanket insulation retaining element such as a disc. In one example configuration, a stop surface is supported by a backing structure having a ramp surface or a slant surface making it easier for a blanket insulation retaining element such as a disc to move along the post element.

Fastener studs, for example for blanket insulation fastener assemblies, in several of the examples herein, may be formed by cutting or stamping a metal sheet to form a planar portion having a section for forming a base and a section for forming an extension. The base may be kept substantially flat, or may be formed to have another profile for being supported on a non-flat support structure. For example, the base may be formed into a clip arrangement for fitting over a stringer. The extension may be formed, such as by bending or rolling, to have two sides with a plurality of converging segments, such as may be used to retain an insulation blanket retaining element for example a disc. The extension may also be formed to extend at an angle to the base, such as perpendicular, as well as curving the extension portion so that the converging segments on the two sides face at least partially in the same direction. In one example, the converging segments on exposed edge surfaces of the extension all face in the same direction, and in another example, the converging segments each include relatively flat surfaces facing toward the base. In another example, the extension is stamped or cut to include additional segments, such as may be used to retain an insulation blanket retaining element, and such additional segments may be cut into a bridge portion on the extension bridging the exposed edge surfaces of the extension. In at least one example, the converging segments may be cut so that each segment includes a flat surface portion, for examples facing a base of the fastener stud, and a slanted or ramp surface portion extending away from the flat surface portion. Adjacent converging segments may be spaced apart from each other a constant distance.

In a further example of a component for a fastener assembly, for example for a blanket insulation fastener assembly, a planar element is provided, for example a disc, with an opening through the element and a free perimeter at the outermost extent of the planar element. The perimeter is a rolled edge configured so that the outer-most perimeter of the planar element is a fold, for example between a middle portion of the planar element and an edge. In one example, the rolled edge has a curved outer perimeter surface, and in another example, the rolled edge forms a double thickness of planar material for a certain radial extent of the perimeter of the planar element.

In another example, the rolled edge is a continuous, radial inward fold of material pressed against the underlying surface of the planar body. Where the planar element is formed from sheet metal, for example, the rolled edge helps to reduce the possibility of sharp edges being exposed to users. In the example of a disc, the planar element is substantially circular, and the rolled edge forms an annular ring adding a layer of thickness at the perimeter. In an example of a retainer for a blanket insulation fastener assembly, the planar element may be a disc and include an opening with a circular aperture, and may also include a plurality of opening segments extending radially from the center.

In another example of a component for a fastener assembly, for example for a blanket insulation fastener assembly, a planar element includes one or more non-planar projections extending from one or more surfaces of the planar element. The projection can be a dimple, ridge, line, bulge, or other protrusion, and the projection can extend from more than one surface of the planar element. In an example of multiple projections, the projections can be evenly distributed over the planar element, they can be placed near a perimeter of the planar element, or they can be placed equidistant from adjacent ones and from the perimeter of the planar element. Where the planar element is coated with a liquid or spray material during a batch process with many other planar elements, the projections help to increase the uniform coating of the planar element while reducing the possibility of multiple elements sticking or binding together. The positioning of the projection or projections may be based in part on reducing the probability of planar surfaces of adjacent planar elements contacting each other and also reducing any possibility of the projection weakening the component. In one example, a projection on a planar element for a fastener assembly is positioned near a perimeter of the planar element, and maybe aligned with a linear aperture through the planar element.

In a further example of a component for a fastener assembly, for example for a blanket insulation fastener assembly, an interface element, for example a grommet, positions a linear post within an opening in a panel or other structure, for example a beam, fuselage or other aircraft structure. The interface element may include structures for accommodating different panel thicknesses, so that a given interface element configuration can be used in a number of different structure configurations. The interface element may include flexible fins, posts or other flexible protrusions extending from a perimeter surface of the interface element, for example to accommodate with one interface element configuration multiple panel widths. Flexible protrusions also help to more securely position the interface element relative to its panel.

These and other examples are set forth more fully below in conjunction with drawings, a brief description of which follows.

BRIEF DESCRIPTION OF THE DRAWINGS

FIG. 1 is a schematic and side elevation view of a fastener assembly in place in accordance with one example disclosed herein.

FIG. 2 is an isometric view of a fastener assembly such as that used in FIG. 1.

FIG. 3 is an upper rear isometric view of a fastener element for use in the fastener assembly of FIG. 2.

FIG. 4 is a top plan view of the fastener element of FIG. 3.

FIG. 5 is a front elevation view of the fastener element of FIG. 3.

FIG. 6 is a vertical longitudinal cross-section of the fastener element of FIG. 3 taken along line 6-6 in FIG. 5.

FIG. 7 is a detailed section view of the fastener element of FIG. 6.

FIG. 8 is a right side elevation view of the fastener element of FIG. 3.

FIG. 9 is an upper isometric view of a fastener element in the form of a retainer disc for use in the fastener assembly of FIG. 2 or with any of the other fastener elements disclosed herein.

FIG. 10 is a top plan view of the fastener disc of FIG. 9.

FIG. 11 is a side elevation view of the disc of FIG. 9.

FIG. 12 is a transverse vertical cross-section of the disc of FIG. 10 taken along line 12-12.

FIG. 13 is a detailed cross-sectional view of part of FIG. 12.

FIG. 14 is a top plan view of a blank for a disc such as may be used to produce the disc of FIG. 10, and showing a ring where bending may occur to produce a folded edge.

FIG. 15 is an upper left isometric view of a fastener element, for example for use with insulation blanket and fastener assemblies, in accordance with another example disclosed herein.

FIG. 16 is a front elevation view of the fastener element of FIG. 15.

FIG. 17 is a top plan view of the fastener element of FIG. 15.

FIG. 18 is a right side elevation view of the fastener element of FIG. 15.

FIG. 25 is an upper isometric view of a fastener element for use with the fastener assembly in FIG. 19 in the form of a grommet.

FIG. 26 is a side elevation view of the grommet of FIG. 25.

FIG. 27 is a left side elevation view of the grommet of FIG. 25.

FIG. 28 is a longitudinal vertical cross-section of the grommet of FIG. 25 taken along line 28-28 of FIG. 27.

FIG. 34 is an upper isometric view of another example of a fastener element for use in a fastener assembly comparable to the assembly shown in FIG. 2 and an alternative to that shown in FIG. 15.

FIG. 35 is a right side elevation view of the fastener element of FIG. 34.

FIG. 36 is a front elevation view of the fastener element of FIG. 34.

FIG. 37 is a vertical longitudinal cross-section view of the fastener element of FIG. 34 taken along line 37-37 of FIG. 36.

FIG. 38 is a detailed cross-sectional view of part of the fastener element shown in FIG. 37.

FIG. 39 is a top plan view of the fastener element of FIG. 34.

FIG. 40 is a bottom plan view of the fastener element of FIG. 34.

FIG. 41 is a rear elevation view of the fastener element of FIG. 34.

FIG. 42 is a bottom rear isometric view of the fastener element of FIG. 34.

FIG. 43 is a side elevation view of another example of a fastener element for use in a fastener assembly comparable to the assembly shown in FIG. 2 and an alternative to that shown in FIG. 3.

FIG. 44 is a left rear isometric view of the fastener element of FIG. 43.

FIG. 45 is a side elevation view of another example of a fastener element for use in a fastener assembly comparable to and an alternative to the fastener stud shown in FIG. 19.

FIG. 46 is a lower isometric view of the fastener element of FIG. 45.

DETAILED DESCRIPTION

Figure 19:
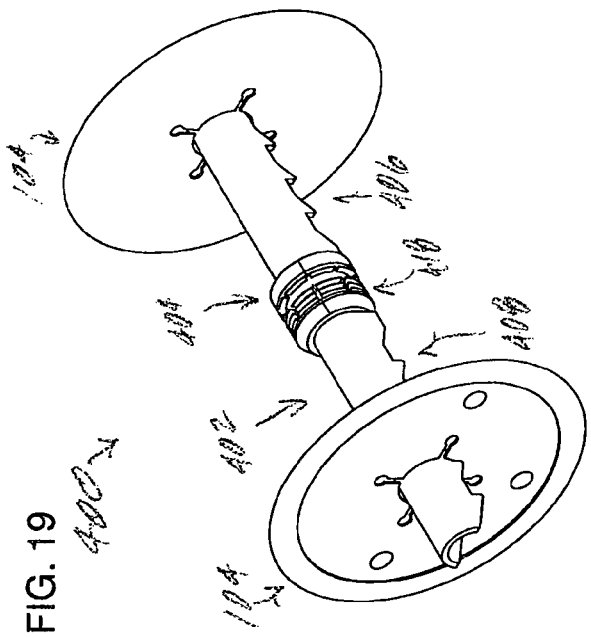
FIG. 19 is an isometric view of a fastener assembly in accordance with another example disclosed herein.
Figure 23:
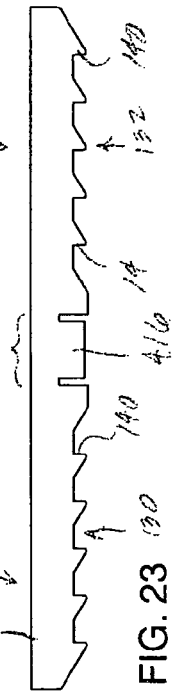
FIG. 23 is a side elevation view of the fastener element of FIG. 20.
Figure 20:
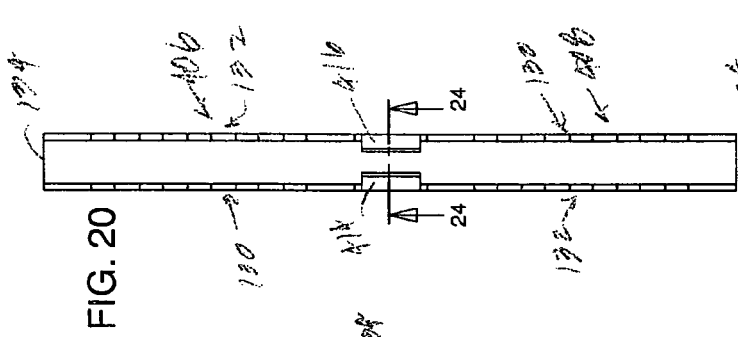
FIG. 20 is a top plan view of a fastener element such as a fastener stud used in the assembly of FIG. 19.
Figure 24:
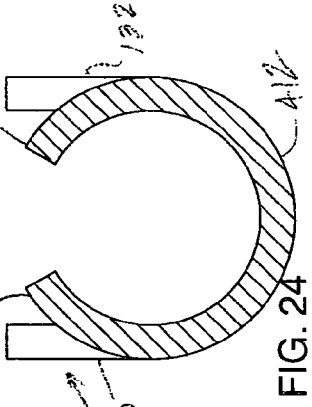
FIG. 24 is a transverse cross-section of the fastener element of FIG. 20 taken along line 24-24.
Figure 21:
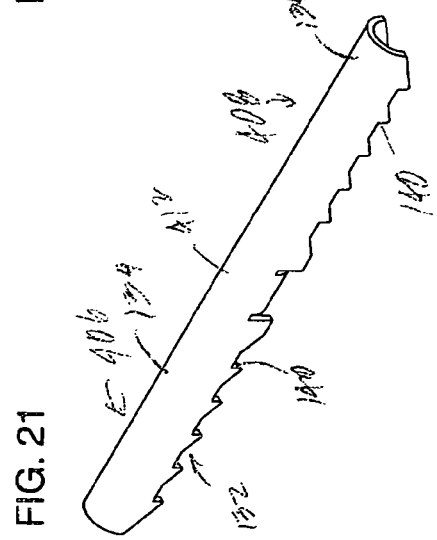
FIG. 21 is a lower isometric view of the fastener element of FIG. 20.
Figure 22:
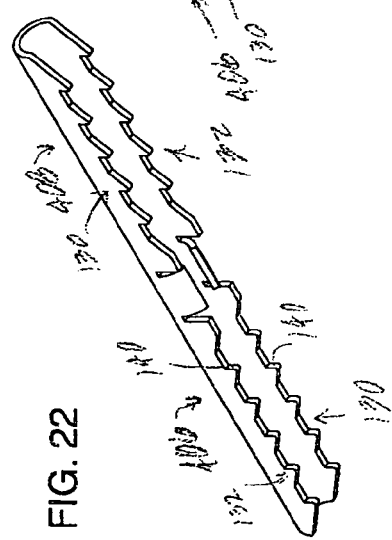
FIG. 22 is an upper isometric view of the fastener element of FIG. 20.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fastener assemblies and of methods of making and using the fastener assemblies are described. Depending on what feature or features are incorporated in a given structure or a given method, benefits can be achieved in the structure or the method. For example, fastener assemblies using formed metal may show improvements under expected operating conditions. They may also demonstrate longer expected lifetimes as well.

Fastener assemblies made according to one or more of the disclosed methods may also be easier to make than other methods using similar materials. They may also be easier to use, and one or more of the components of a fastener assembly may possibly be reused rather than discarded after routine maintenance, for example.

In some configurations of one or more fastener assemblies disclosed herein, improvements can be achieved also in assembly, and in some configurations, a relatively smaller number of components can be used to provide a larger number of configurations of some fastener assemblies.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fastener assembly or fastener element configurations and of methods of making and using the fastener assemblies or fastener elements are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Fastener assemblies are described that may have particular application to insulation blanket fastener uses, and they can incorporate one or more of the features and derive some of the benefits described herein when used in those applications. However, only several applications for insulation blanket fasteners will be described. Fastener assemblies other than for insulation blanket fasteners can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

Lining fasteners such as those that can be used as insulation blanket fasteners have a number of applications, but the present examples of fastener assemblies will be described in the context of insulation blankets, such as those used on aircraft. It should be understood that the fastener assemblies described herein may also be used on other structures and secure or hold other structures or materials. In one example of a fastener assembly, a fastener assembly 100 (FIGS. 1-14) is supported on a suitable support surface 98, selected by the designer, which is part of a support structure 96. The support structure 96 may be, in the context of aircraft, a fuselage, beam, stringer or other structure, as to which an insulation blanket is to be supported. In all of the examples of fastener assemblies described herein, the fastener assemblies are supported on a structure. The structure may take a number of forms, profiles or configurations, and the fastener assembly design may be configured to accommodate the particular surface configuration of the supporting structure. Those skilled in the art will appreciate after reviewing the examples how the examples of the present invention can be adapted to support structures other than those described herein while still adopting one or more of the features of the inventions.

In the example shown in FIG. 1, the support structure is shown as being relatively flat, and the fastener assembly 100 is configured accordingly. The fastener assembly is supported on the support surface 98 by adhesive, rivets or other fasteners, clips or other means for securing the adjacent part of the fastener assembly to the support surface. All of the fastener assembly configurations described herein can be customized or revised to the user's specifications to be secured to the appropriate support surface as desired.

The fastener assembly 100 secures and positions a lining such as an insulation blanket 94 (FIG. 1). As noted herein, the fastener assemblies described as examples herein can be used or modified to secure and support a number of structures.

The fastener assemblies described herein include a fastener stud and a liner or blanket retaining element, and while the examples described herein have the two elements being used together, one or the other of the elements may also be used with other structures as an assembly. In the example shown in FIGS. 1-14, the fastener assembly 100 includes a fastener stud 102 (FIGS. 1-8 in the present example) and a retaining element 104 (FIGS. 1-2 and 9-13 in the present example). Several fastener studs will be described herein having several configurations, but all of the examples of such fastener studs in these examples will be used with a retaining element 104 described herein, but it should be understood that other retaining elements can be used with the fastener studs to form a fastener assembly. The fastener assemblies using the fastener studs described herein can be used to secure and position a lining or insulation blanket, such as in a manner described herein with respect to FIG. 1.

In the present example, a fastener stud 102 includes a support portion 106 for supporting the fastener stud and therefore the fastener assembly on a support surface. The fastener stud 102 also includes an extension 108 supported by the support portion 106 around which the insulation blanket extends and along which the retaining element 104 can be moved and secured in place to hold the insulation blanket. In the present example, the support portion 106 is substantially planar and the extension 108 extends substantially perpendicular to the support portion. In the examples of the fastener studs described herein, including the present example, the fastener stud is formed from sheet metal.

The support portion 106 of the fastener stud (FIGS. 2-8) is formed as a partially circular panel 110 having a perimeter portion 112 extending through an angle of approximately 3150 relative to the center of the panel. The panel's circular portion terminates at first and second cut surfaces 114 and 116 (FIG. 4) extending outward of the panel substantially perpendicular to a diameter (not shown). The cut surfaces 114 and 116 allow the extension 108 to be formed from the same sheet or portion of material as the panel 110, thereby allowing the fastener stud to be formed as a monolithic component, for example without welding, joining or otherwise bringing together two separate parts to form the fastener stud. The cut surfaces 114 and 116 terminate at respective strain relief portions 118 and 120.

The panel 110 may include one or more structures for assisting in mounting or holding the fastener stud to its support surface. In the example shown in FIGS. 2-8, the panel 110 includes first and second openings 122 and 124 that can be used to help secure the fastener stud on the support structure. The openings in the present example are formed on a diameter of a circle of which the panel 110 is a part. (See, for example, FIG. 31.) The openings 122 and 124 can receive rivets or other mechanical fasteners for mounting the fastener stud to the support surface. The openings may also or instead receive adhesive or other bonding material for holding the fastener stud in place. The panel 110 may also include a roughened bottom surface (not shown) to help in securing the fastener stud to the support surface, for example through adhesive. The panel 110 may also be formed such as through bending, punching or other forming process to conform more closely to support surface, for example where the support surface has complementary bent or other surfaces. The panel 110 may take other configurations in order to more securely support the fastener stud on the support surface.

The extension portion 108 of the fastener stud is formed monolithic with the panel 110 and extends substantially perpendicular from the upper face of the panel (FIGS. 2-8). The extension portion 108 is formed as a substantially straight post 126 perpendicular to the panel. The post 126 joins the panel through curved portions 128 formed during the bending or forming process, and then extends substantially perpendicular to the panel 110 with first and second, or left and right as viewed in FIG. 5, side portions 130 and 132, respectively. The side portions are supported from below by the curved portions 128 and from behind, as viewed from above in FIG.

4, by a bridge or connection portion 134. The bridge portion is supported from below by the curved portions 128, and in the present example is curved substantially in a semi circle. The semicircular bridge shape helps to provide strength to the extension 108, for example against bending, side (for example perpendicular to the extension 108) impact and the like. The bridge shape can have other configurations as well, but having a semicircular outer surface shape helps to guide the retainer 104 through its corresponding circular opening, described more fully below.

The post 126 includes a substantially flat end surface 136 forming an end of the post, and the wall thickness of the bridge, as well as the rest of the post, is substantially constant. The flat end surface 136 terminates at an end 138 that will be identified in the present example as the end of the bridge portion and the beginning of support portions of the first and second sides.

In the present example, the first and second sides include a plurality of retaining surfaces 140 for helping to retain the retaining element 104 in place on the post 126. The structures of the retaining surfaces in each of the examples described herein are substantially the same, and generally include a relatively flat, downwardly-facing surface 142 (FIG. 7). In a complete assembly of a fastener assembly 100 having a generally perpendicular planar base 110, the surface 142 is selected to be substantially parallel to the planar base 110, and it will also be substantially parallel to the plane of the retaining element 104, which in turn may be generally parallel to the insulation blanket being held in place by the fastener assembly. However, it should be understood that other retaining surface configurations can be used to help to adequately retain the retaining element 104 in place on the post 126. The retaining surfaces 140 can be formed as flange elements, knurls, or other projections for inhibiting the withdrawal of a retaining element 104.

In several examples of the fastener assemblies described herein (FIGS. 1-30), the retaining surfaces 140 are formed as parts of triangular-shaped teeth 144 (FIG. 7). The retaining surfaces 140 form one portion of a right triangle extending perpendicular to a vertical surface 146, extending substantially parallel to a central axis of the post. The retaining surface 140 and a continuation of the vertical surface 146 form perpendicular sides of the right triangle, the hypotenuse of which is an angled surface 148 extending outward and downward from an adjacent vertical surface 146. If the retaining surfaces 140 did not form the side of a triangle, the surface 146 could be a sloping surface, a slanted surface, a ramped surface, a cammed surface or another transition surfaced between the respective retaining surface and the rest of the post. In the present examples, the angled surface 148 terminates at the retaining surface 142 through a radiused corner 150. The angled surface 148 helps to guide the retaining element 104 axially along the post toward the panel 110 and the radiused corner 150 makes easier the manual removal of the retaining element 104, for example for maintenance. The material of the triangular-shaped teeth provides structural support for the retaining surfaces 142 on a support portion of the first and second sidewalls. The thickness of the teeth is selected to be the same as the thickness of the underlying support structure and the bridge portion.

The teeth are supported on an underlying support structure that is continuous with the teeth and continuous with the bridge 134, for example because all are formed from the same sheet of material and the fastener stud is monolithic. The underlying support structure may be considered to start with a vertical surface 146 and continue to meet the bridge structure 134, for example at a vertical line extending downward from the ends 138 of the bridge portion. As shown in FIGS. 2 and 6, each uppermost tooth 144 has the angled surface 148 continuous with an upper angled surface 152. The upper angled surface 152 begins where the tooth ends and terminates at the other end at the respective end 138 of the bridge portion. The upper angled surfaces 152 help to guide the retaining element 104 along the post once the retaining element 104 is placed over the end of the post. The upper angled surfaces 122 can take other configurations as well.

Each tooth 144 is spaced apart from an adjacent tooth by a respective portion of the vertical surface 146. Each of the vertical surfaces 146 in the present examples has substantially equal lengths, so that vertically adjacent teeth are spaced from each other approximately the same distance (have the same pitch). The vertical length of each vertical surface 146 is selected to be greater than the thickness of the retaining element 104 where the retaining element extends around the post. In one example where the retaining element core thickness is about 0.25 mm (0.0098 inch), the height of a given vertical surface 146 maybe about 2.8 mm (0.1102 inch), or about 10 times the retaining element thickness. In other examples, the retaining element can be selected to be between 10% and 50% of the height of the vertical surfaces 146. Other relative dimensions can be used. Additionally, the spacing defined by the vertical surfaces, or the center-to-center distances for adjacent teeth, can be varied on a given fastener, though teeth arranged around a perimeter preferably remain at the same axial position relative to each other. In other words, the pitch of the teeth can vary axially of the fastener.

In each of the examples here in, and as shown in the example of FIGS. 2-8, the first and second side portions have identical numbers of teeth. Additionally, each side portion has a tooth at the same axial height or position as a tooth on the other side portion. The side portions are mirror images of each other in these examples about a vertical, front-to-back plane, such as the plane forming the section represented in FIG. 6. The fastener stud is symmetric about that plane. Each tooth corresponding to a tooth on the other side portion forms a pair of teeth. Each pair of teeth have retaining surfaces 142 at the same axial position on the post, and in the present examples, the retaining surfaces 142 in a pair of teeth fall in a plane parallel to the retaining surfaces in the other pairs of teeth. Additionally, all the retaining surfaces extend substantially the same distance from their respective vertical surfaces 146, and all of the angled surfaces form an angle to the vertical surfaces 146 the same as the angles of the others. Additionally, because the first and second sides are spaced apart from each other, there are no teeth and therefore no retaining surfaces 142 in the space directly between pairs of teeth. Similarly, there is no support material extending directly between the support portions for respective sets of teeth. In the disclosed examples, the bridge portion 134 and the planar portion 110 form the only rigid connections between the first and second sides and their respective teeth. Additionally, in the examples shown in FIGS. 2-33, the retaining element 104 is stopped or retained by parallel surfaces at only two locations, namely each pair of teeth retaining the retaining element 104, and the bridge portion 134 serves as a third point or area of contact with the retaining element 104.

The post in the example of FIGS. 2-8 has a substantially U-shaped profile in transverse cross-section. However, other profiles can be used. The outer surface of the post is substantially smooth between the first and second sides.

Each of the fastener studs discussed herein can be combined with an insulation blanket retaining element such as the retaining element 104 in FIG. 2 to form a fastener assembly. As a fastener assembly, the fastener assembly will include a fastener stud and a retaining element, such as retaining element 104. The retaining element may be planar or non-planar, and may have a number of outer profiles, including circular, triangular, rectangular, pentagonal, hexagonal, as well as other profiles, uniform or non-uniform. The retaining element can be substantially flat, or may have projections, protrusions, extensions or other structures making the retaining element other than flat. In the present examples described herein, a given fastener stud will use the retaining element 104 described herein (FIGS. 9-13). However, it should be understood that any of the fastener studs described herein can be used with a retaining element other than that described herein, and the retaining element 104 described herein can be used with a number of other fastener studs other than those described herein for fastener assemblies.

The retaining element 104 (FIGS. 2 and 9-13) is an element configured to cooperate with a fastener stud to retain an insulation blanket in place about the fastener assembly. The retaining element 104 is substantially flat over a large percentage of the surface area of the retaining element. A first set of surface irregularities are formed by a plurality of dimples or other protrusions formed in the retaining element outside the center but inside the perimeter of the retaining element. A second surface irregularity is formed at the perimeter of the retaining element to reduce or eliminate sharp edge portions about the perimeter of the retaining element. Either or both of the surface irregularities described herein can be omitted, but each can provide a benefit if desired.

The retaining element 104 is substantially circular in outer profile. The retaining element 104 in the present examples takes the form of a disc, and may be formed from a relatively thin metal sheet. The diameter and thickness of the disc and the material of the disc are selected so as to be sufficient to reliably retain insulation blankets with which the disc is to be used.

The retaining element 104 includes a wall 200 defining an opening 202 within which the post of a fastener stud is received. The wall 200 includes a plurality of radially-extending cuts or grooves 204, extending outward from a center of the disc. Each groove 204 terminates in a substantially circular opening 206, forming stress relief points for each of the grooves 204. In the example of the retaining element 104, 4 grooves are formed in the disc, in two pairs with each pair on a diameter and the two diameters perpendicular to each other. Adjacent grooves define between them flexible edge portions 208. The grooves 204 provide a measure of flexibility for the flexible edge portions 208 surrounding the opening 202, so that the edge portions 208 can flex when the disc is passed over the teeth of the post element 108. The thickness of the retaining element and the material from which it is formed as well as the lengths of the grooves 204 will affect the flexibility of the edge portions 208.

The disc includes a body or core 210 extending outward from the opening 202 to a perimeter edge 212, which in the present case is a circumferential edge. The core is substantially planer with a uniform thickness, except for the surface irregularity in the form of dimples. In the present example, the core is approximately 0.25 mm thick.

In the examples shown in FIGS. 2, 9-13 and 19, the core of the disc includes a plurality, in the present case, of protrusions 214, each performing a surface irregularity in the core. In the present example, the protrusions are positioned closer to the outer perimeter of the disc than to the center, and are positioned on a respective radius of the disc. In the examples shown in the drawings, the protrusions 214 are evenly distributed, and in the present example they are oriented on a same radius as respective ones of the grooves 204. The arrangement provides pairs of protrusions, each pair being arranged on a diameter perpendicular to that of the other pair. In another example (not shown), the pairs of protrusions are arranged on respective diameters oriented at 45° from the diameters on which the grooves 204 are placed. Also in the examples shown in the drawings, the protrusions extend outwardly in the same direction from the plane of the disc, for example upward from a first surface 216 and away from a second surface 218, as viewed in FIGS. 11 and 12. The protrusions help to keep adjacent discs spaced apart, for example during some manufacturing processes, during storage, and the like.

In another example (not shown), at least one protrusion in the case of a plurality of protrusions, and for example approximately half the protrusions, are formed in the core facing in one direction from the core and the other protrusions face in the opposite direction from the core. Protrusions facing in different directions from the core reduce the possibility of nesting of protrusions on adjacent discs, or protrusions on adjacent discs facing only in opposite directions. The protrusions may be partial spherical projections from the surface of the disc core or they may take other configurations. The protrusions may be ridges and/or grooves or valleys, bumps, lines, dimples or other surface irregularities extending from the core surface. The height of each protrusion from the planar surface of the core may be greater than or equal to a core thickness plus an amount slightly greater than an approximate thickness of any coating (described below) applied to the retaining element 104. The height of each protrusion may be selected so as to ensure the planar portions of cores of adjacent discs and rolled edges of adjacent discs do not contact each other over an extended surface area, thereby reducing the possibility of adjacent discs binding together, such as through dried coating on the discs.

The disc of the retaining element 104 includes a perimeter irregularity 220. In the present example, the edge of the core is folded under, for example to the second side 218 of the core, to form a folded edge 222. The folded edge forms the perimeter, and in the example of the circular retaining element the circumferential edge, of the disc. The folded edge 222 in the present example forms a substantially semicircular rounded edge in cross-sectional profile, which extends completely around the perimeter of the retaining element disc. The rounded edge reduces the occurrence of the sharp edges, and improves handling. The folded edge of the core extends a significant radial distance under the second side 218 of the disc, which also provides additional strength to the disc. As shown in FIG. 13, the exposed edge 224 of the core extends radially inward more than half the distance between the folded edge 222 and a circle containing the outermost edges of the protrusions 214.

The retaining element 104 is formed by cutting a circular disc such as at 226 in FIG. 14. The rolled edge is formed by first bending an annular ring 228 at the outer perimeter of the disc 226, for example 90° downward, at a bending line represented by the circle 230. The bent annular ring 228 is then hemmed to extend under the disc and adjacent the second side 218, as shown in FIG. 13. The exposed edge 224 of the core now extends inward. The opening 202 and the grooves 204 in the center of the disc are cut or punched from the center of the disc, and a first plurality of protrusions are formed beyond the first side 216 and a second plurality of protrusions are formed beyond the second side 218. The order of the processing steps may be selected as desired. In a subsequent step, a plurality of discs may be coated with a suitable coating in a batch process. The protrusions 214 help to reduce the amount of continuous surface area over which adjacent discs are contacting. They help to reduce the possibility that adjacent discs will become bonded together. The disc may be formed from known metals, including for example CRES 304 and AI 2024. A coating applied may be cadmium or aluminum coatings or non-metallic coatings, for example nylon or other polymeric coating or paint.

In another example of a fastener stud, such as one that may be clipped on to a support structure (FIGS. 15-18), a fastener stud 300 includes a post element 108 having first and second sidewalls 130 and 132, respectively, connected and supported by a bridge portion 134. The post element also includes a plurality of retaining surfaces 140 on each of the first and second sidewalls. The post element 108 has the same structures and functions as the post element 108 and its structures and functions described with respect to FIGS. 2-8, the description of which is incorporated herein by reference.

The fastener stud 300 includes a support element 302 for supporting the post element on the underlying support structure. The support element 302 includes a substantially planar panel 304 supporting the post element substantially perpendicular thereto. The planar panel 304 includes strain relief grooves 306 on respective sides of support wings around the post 108. The planar panel 304 extends outward to left and right curved portions 308 and 310, respectively, which provide a transition to corresponding left and right angled plates 312 and 314, extending front to back of the support element 302. The angled plates 312 and 314 provide bias plates for applying pressure to an underlying support structure to help hold the fastener stud in place on the underlying support structure. The angled plates 312 and 314 then curve outwardly to respective ramp plates 316 and 318. The ramp plates help guide the placement of the fastener stud over the corresponding support structure.

The fastener stud 300 can be formed from the same material as the fastener stud 102, and using similar processes. Additionally, the fastener stud 300 can be used in a fastener assembly with the retaining element 104 in a manner similar to that described with respect to the fastener element 102. The fastener stud 300 can also be used with other retaining elements.

In another example of a fastener assembly, fastener assembly 400 (FIGS. 19-30) includes a through fastener stud 402, a support assembly 404 and substantially oppositely disposed retaining elements 104, identical or similar to the retaining elements discussed herein. The fastener stud 402 includes post elements 406 and 408, substantially identical to the post 108 on the fastener stud 102 of FIGS. 2-8. The post elements 406 and 408 include first and second sidewalls 130 and 132, respectively, connected and supported by respective bridge portions 134. The post elements also include respective pluralities of retaining surfaces 140 on each of the first and second sidewalls. The post elements 406 and 408 have the same structures and functions as the post element 108 and its structures and functions described with respect to FIGS. 2-8, the description of which is incorporated herein by reference.

The through fastener stud 402 further includes a support interface 410 formed monolithic with the fastener studs 406 and 408, and includes a bridge element 412 (FIG. 21) coextensive with the bridge elements 134 on the post elements 406 and 408. The support interface 410 also includes arcuate wings 414 and 416 supported by the bridge 412. The bridge element 412 and the wings 414 and 416 form a partial or complete circle for the support interface 410.

The support interface 410 in turn supports a structure interface, in the present example a grommet 418 (FIGS. 19 and 25-30), and together they form the support assembly 404. The support assembly 404 supports the post elements 406 and 408 relative to a support structure. In the present example, the support structure is a panel 420 (FIGS. 29-30), which may be a structural member. The through fastener stud 402 extends through an opening 422 in the panel, and in turn supports an insulation blanket, for example. The support assembly 404 in the present example includes the grommet 418 described herein, but other structures may be used to support the posts within an opening such as the opening 422 in the panel.

The grommet 418 is a relatively flexible, partially cylindrical element. It has a substantially cylindrical body 424 with an axially extending cut or groove 426 along the entire axial length of the grommet. The cut produces first and second facing sides 428 and 430, respectively (FIG. 27), in the grommet so that the grommet is only a partially cylindrical body. The inside surface 432 is substantially smooth extending in the axial direction and terminates at one end at a substantially cylindrical ring 434 extending radially outward from the inside surface to a first outer ring surface 436. The cylindrical ring 434 defines a first end face 438 forming one axial end of the grommet.

The inside surface 432 terminates at a second end at a second end face 440, which also forms the end of a frustoconical section 442 extending axially along the grommet to a second cylindrical ring portion 444. The second cylindrical ring portion 444 helps to guide the grommet into the panel opening. The first and second cylindrical rings 434 and 444 define in the radial direction the outer boundaries of the grommet, and the rings define in the axial direction the outer boundaries of an intermediate groove area 446 extending around the body of the grommet. The groove area includes a plurality of rings of fins 448.

The fins are flexible relative to the panel within which the grommet is placed. In the present example, each ring includes a plurality of fins, and each of the fins within a given ring are positioned at the same axial location relative to each other. Each of the fins within a given ring are separated from adjacent fins in the same ring by an axially extending groove or gap so that the fins in a ring are spaced apart from each other. The outside dimension of each of the fins is substantially the same as the outer diameter of the grommet, and the cross-sectional profile of each fin is substantially a right triangle, in the present example. In one example where the outside diameter of the grommet is about 0.3740 inch, the fin height from the bottom of the groove can be approximately 0.0311 inch and a slanted surface or hypotenuse of the triangle could be approximately 0.0326 inch, and the base of the triangle approximately 0.0100 inch or similar ratios. In the present example, the depth of the groove area is 0.0311 inch, and the axial length of the groove is approximately 0.1720 inch for an overall grommet axial length of about 0.3120 inch. The grommet length and inside diameter are selected so as to provide a snug fit over the support interface 410 and between the adjacent ends of the stud posts, allowing relatively little axial movement between the grommet and the through stud. Other dimensions for the grommet can be used having similar ratios. Also in the present example, each ring has eight fins, but other numbers of fins can be used in a given ring, and they can all be the same or different sizes, for example as a function of proximity to the gap 426.

Figure 30:
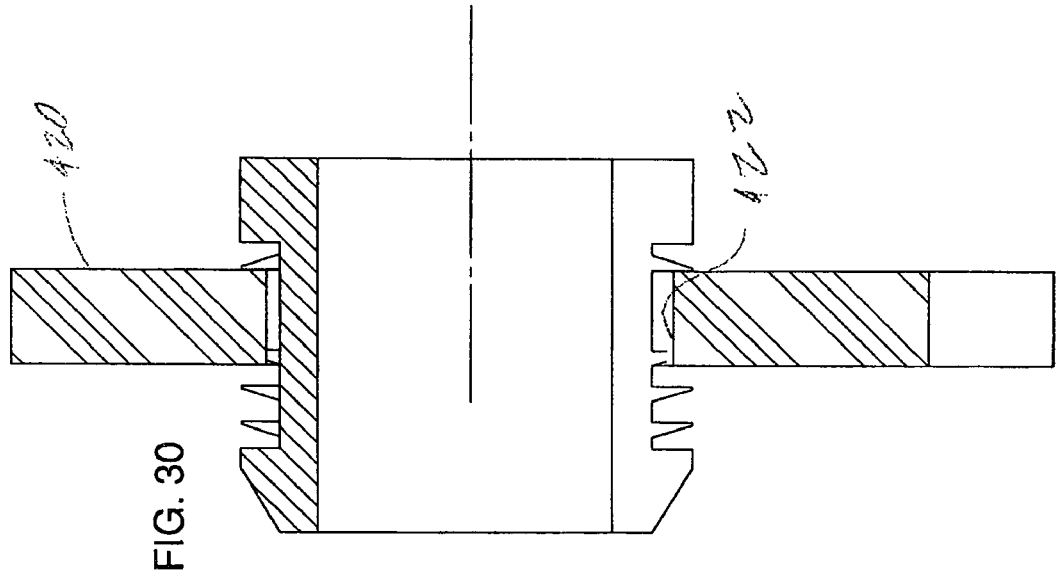
FIG. 30 is a cross-sectional view of the panel and grommet combination shown in FIG. 29 taken along line 30-30.
Figure 29:
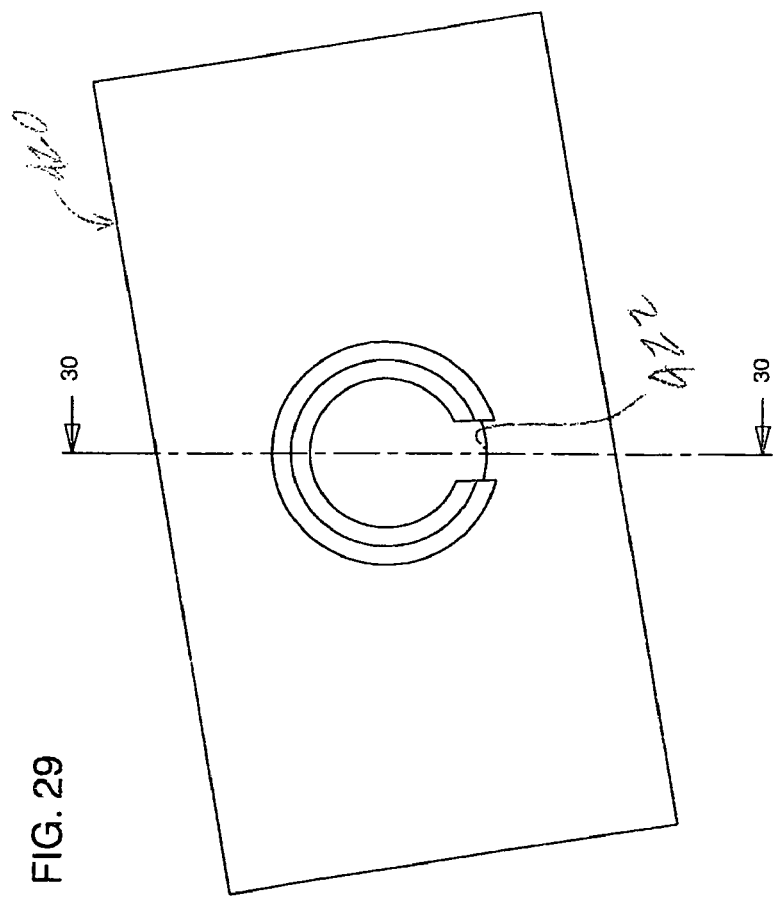
FIG. 29 is a top plan view of a panel and a grommet for purposes of illustrating the inter-fitting of a grommet with a panel.

In the example of the grommet shown in FIGS. 25-30, the grommet includes a first ring 450 with the sloped or slanted faces of the fins facing the first cylindrical ring 434. The grommet includes three additional rings 452, each with the slanted faces of the fins facing the second cylindrical ring 444, opposite the direction in which the slanted faces of the fins in the first ring 450 are facing. Additionally, the first ring of fins 450 is spaced farther apart from the other rings 452 than the rings 452 are spaced apart from each other. This spacing provides a relatively large annular groove 454 for receiving the width of the panel 420. This spacing 454 is chosen to be approximately the same as the width of the panel. The first ring 450 may be configured to help bias the grommet relative to the panel to provide a more secure positioning of the fastener assembly. The additional rings 452 are provided also to bias the panel, but also to permit the same grommet to be used on a number of thicker panels than are intended to fit the groove 454. The grommet configuration thereby allows a single grommet to be used with panels of different thicknesses. For example, the size, number and spacing of the rings of fins can be configured to accommodate panel thickness variations in increments of 1/16 of an inch, or in other increments, for example as a function of expected panel thickness variations. In one example, the rings of fins can be spaced so that the flat sides of the fins in a given ring are flexed slightly away from the panel by panel thickness so that the ring of fins contacting the panel bias the panel toward the ring of fins on the opposite side of the panel. In another example, the rings can be spaced so that a panel thickness is slightly less than the spacing of fin rings falling outside the panel surfaces, such as shown in FIG. 30.

The grommet may be made out of a relatively soft and flexible resilient material such as nylon. The grommet can have other configurations than cylindrical, for the inside profile and/or for the outside profile. One or both of the profiles may be used to require a desired orientation for the grommet relative to the through stud and/or the grommet relative to the panel. The grommet can be snapped onto the support interface 410 of the through stud, and can also be reused if desired after removal for maintenance, for example.

Figure 33:
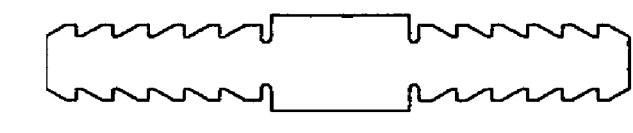
FIG. 33 is a top plan view of another example of a fastener element from a blank prior to forming.
Figure 32:
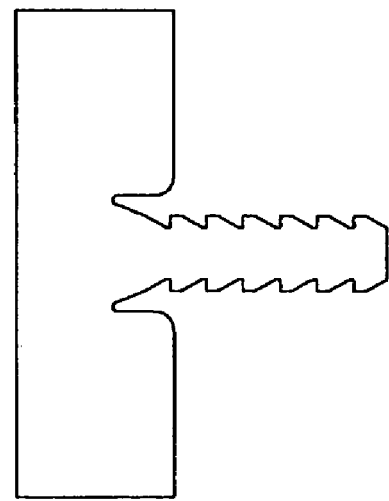
FIG. 32 is a top plan view of another example of a fastener element cut from a blank prior to forming.
Figure 31:
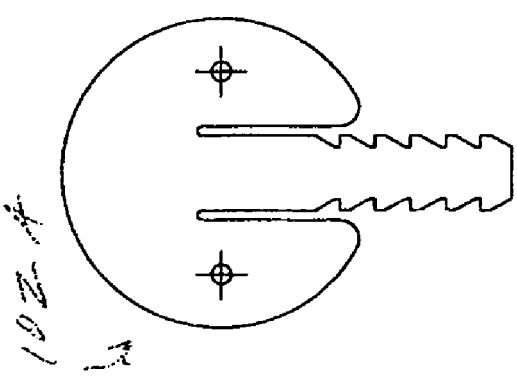
FIG. 31 is a top plan view of a fastener element cut from a blank prior to forming.

Any of the fastener studs described herein can be formed from sheet metal blanks cut and formed into the desired final configurations. They can be formed from known metal materials, including steel alloys, aluminum, stainless steels, titanium and other suitable metals. Forming can be by a number of methods, including one-shot forming and progressive dies. The metals can be processed before and after forming by known methods, including tempering or hardening, and the like. The final product can also be tumbled, coated, smoothed, polished or otherwise. The fastener stud 102 can start with a cut blank similar to 102A shown in FIG. 31, with the post element being bent away from the support plane and then rolled into the U-shape. The fastener stud 300 can start with a cut blank similar to 300A shown in FIG. 32 with the post being bent perpendicular to the support clip and formed into a U-channel and the support clip bent into the form shown in FIGS. 15-18. The through stud 402 can start with a cut blank similar to 402A in FIG. 33 with the entire blank being rolled into a U-channel and the wings 414 and 416 bent further to form a circular profile. While the various dimensions of the elements can be selected as desired, it is noted that the lengths in the axial direction for the vertical walls 146 in the posts shown in FIGS. 31-33 are approximately 0.030 inch (0.762 mm or about three times the retaining element 104 core thickness), whereas the lengths shown in FIGS. 2-23 are about 0.1 inch. In the examples shown in FIGS. 31-33, the retaining element 104 core thickness would be about 33% of the spacing between adjacent teeth on the post. It should be noted that the relative dimensions of lines or elements in a given FIG. are to scale, within the same FIG., but the drawings as between two different FIGS. are not all to the same scale.

In another example of a fastener stud (FIGS. 34-42), a fastener stud 500 includes a support portion 502 and an extension portion 504, each of which have features that can be used in other fastener studs described herein. For example, the extension portion 504 can be used as any of the posts in the fastener studs in the other examples. Additionally, the support portion 502 includes a raised support 506, between a planar support panel 508 and the extension portion 504, that can be incorporated into the fastener stud 102.

The fastener stud 500 has the substantially planar panel 508 supporting the extension 504 perpendicular to the planar panel 508 and includes strain relief grooves 510 on respective sides of the raised support 506. The raised support 506 is a substantially U-shape profile of material (sheet metal in this example) extending upward from the planar panel 508 to support the extension 504. Strain relief openings (FIGS. 34-35, 37 and 42) may also be formed in part of the raised support 506 at the ends of corresponding strain relief grooves 510.

The planar panel 508 extends outward to the left and right curved portions 512 and 514, respectively, which provide a transition to corresponding left and right angle plates 516 and 518, respectively (FIG. 36), extending front to back of the support element 502. The angle plates 516 and 518 then curve outwardly to respective ramp plates 520 and 522, respectively. The planar panel 508 has a profile, in plan view such as can be seen in the plan views of FIGS. 39-40, with a main central portion and swept wings 508A and 508B sweeping from the raised support 506 forward to the left and right curved portions 512 and 514, respectively. The swept wings 508A and B are defined in part by the angled front and rear edges of the planar panel 508. The actual start and end points for the swept wings may vary as a function of the cutting of the blank and how the part is formed into the final configuration. The profile of the support helps to support the fastener under the expected loading by more uniformly distributing the load across the underlying support structure.

The extension portion 504 of the fastener stud is formed monolithic with the support portion 502. The extension portion 504 is formed as a substantially straight post 524 perpendicular to the panel 508. The post 524 joins the raised portion 506 through curve portions 526 (FIGS. 35 and 38) formed during the bending or forming process, and then extends substantially perpendicular to the plane of the panel 508 with first and second, or left and right as viewed in FIG. 36, side portions 528 and 530, respectively. The side portions are supported from below by the curved portions 526 and from behind, as viewed from above in FIG. 39, by a bridge or connection portion 532. The bridge portion is supported from below by the curved portions 526, and in the present example is curved substantially in a semi circle over a substantial portion of the axial length of the post 524. The semicircular bridge shape helps to provide strength to the extension 504, for example against bending, side (for example perpendicular to the extension 504) impact and the like. The bridge shape can have other configurations as well, but having a semicircular outer surface shape helps to guide the retainer element 104 through its corresponding circular opening, described more fully above.

The post 524 includes a substantially flat end surface 534 forming an end of the post, and the wall thickness of the bridge, as well as the rest of the post, is substantially constant, when measured from the inside surface to the outside surface and normal thereto. The end of the bridge portion transitions to support portions of the first and second sides, such as may begin with the transition between a flat end surface 534 and a start of a ramp surface 536, and the support portions may be considered to end at the beginnings of teeth 538. In the present example, the first and second sides include a plurality of retaining surfaces 540 for helping to retain the retaining element 104 in place on the post 524. The structures of the retaining surfaces 540 are substantially the same as the retaining surfaces 140, and include a relatively flat, downwardly-facing surface 542. As with the surface 142, the surface 542 is selected to be substantially parallel to the planar panel 508, and it will also be substantially parallel to the plane of the retaining element 104, which in turn may be generally parallel to the insulation blanket being held in place by the fastener assembly. Other retaining surface configurations can be used to help adequately retain the retaining element 104 in place on the post 524. The retaining surfaces 540 can be formed as flange elements, knurls, or other projections for inhibiting the withdrawal of the retaining element 104.

The retaining surfaces 540 are formed as part of polygon-shaped teeth 538 (FIG. 38). The retaining surfaces 540 form one portion of a polygon having a side extending perpendicular to a vertical surface 544, extending substantially parallel to a central axis of the post. If desired, the polygon can also be shaped as a triangle, or other shapes. The retaining surface 540 and a continuation of the vertical surface 544 form a right angle and two sides of the polygon, with an axially-extending surface 546 and a slanted or angled surface 548 extending outward and downward from an adjacent vertical surface 544 to the adjacent surface 546. The surfaces 546 and 548 could be a sloping surface, a slanted surface, a ramp to surface, a cam surface or another transition surface between the respective retaining surface and the rest of the post. In the examples of FIGS. 34-44, the surface 546 terminates at the retaining surface 542, and may include a radiused corner. The angled surface 548 helps to guide the retaining element 104 axially along the post toward the planar element 508. The material of the teeth 538 provides structural support for the retaining surfaces 542 on respective support portions of the first and second sidewalls. The thickness of the teeth is selected to be the same as the thickness of the underlying support structure and the bridge portion.

The teeth are supported on an underlying support structure that is continuous with the teeth and continuous with the bridge 524, for example because all are formed from the same sheet of material and the fastener stud is monolithic. Other than as described herein, the post 524 has the same structures and functions as the post 108 described with respect to FIGS. 2-8. The upper angled surfaces 530 begin at the flat upper surface 534 and ends at the beginning of the respective top tooth 538. The upper angled surfaces 530 help to guide the retaining element 104 along the post once the retaining element 104 is placed over the end of the post.

Each tooth 538 is spaced apart from an adjacent tooth by a respective portion of the vertical surface 544. Each of the vertical surfaces 544 in the present example has substantially equal lengths, so that vertically adjacent teeth are spaced from each other approximately the same distance. The vertical length of each vertical surface 544 is selected to be greater than the thickness of the retaining element 104 at the point where the retaining element extends around the post. In one example where the retaining element thickness is about 0.25 mm, the height of a given vertical surface 544 may be about 0.768 mm. Other relative dimensions can be used.

In each of the examples herein, and as shown in the examples of FIGS. 34-42, the first and second side portions have identical numbers of teeth. Additionally, each side portion has a tooth at the same axial height or position as a tooth on the other side portion. The side portions are mirror images of each other in this example about a vertical, front-to-back plane, such as the plane forming the section represented in FIGS. 37. The fastener stud is symmetric about that plane. Each tooth corresponding to a tooth on the other side portion forms a pair of teeth. Each pair of teeth on the respective side portions have retaining surfaces 542 at the same axial position on the post, and in the present example, the retaining surfaces 542 in a pair of teeth on the side portions fall in a plane 550 (FIG. 35) parallel to the retaining surfaces in the other pairs of teeth. Additionally, all the side portion retaining surfaces extend substantially the same distance from their respective vertical surfaces 544, and all of the angled surfaces form an angle to the vertical surfaces 544 the same as the angles of the others. Additionally, because the first and second sides are spaced apart from each other, there are no teeth and therefore no retaining surfaces 542 in the space directly between pairs of teeth. Similarly, there is no support material extending directly between the support portions for respective sets of teeth. In the disclosed examples in FIGS. 34-46, the bridge portion 524 and the raised portion 506 form the only rigid connections between the first and second sides and their respective teeth. However, in the examples shown in FIGS. 34-46, the retaining element 104 is stopped or retained by parallel surfaces at more than two locations, namely each pair of teeth that retain the retaining element 104 and at least one additional retaining element on the bridge portion, described below. The bridge portion also serves as an area of contact for the retaining element to the extent of the semicircular surface.

The post in the example of FIGS. 34-46 has a substantially U-shaped profile in transverse cross-section except for additional retaining elements on the bridge portion (or as may be added elsewhere on the post, if desired). In the examples shown in FIGS. 34-46, an additional disc retaining structure, such as a tooth 552, is formed in the bridge portion, in the present examples of FIGS. 34-46 in the plane of each of the other teeth in the corresponding pair of teeth at the same axial position on the post. In these examples, each tooth 552 includes a retaining surface 554 extending parallel to the plane 550. The retaining surface 554 is supported by a support structure 556 forming the tooth 552. The tooth 552 also includes a slanted or sloped surface 558, helping to guide the retaining element 104. With the three teeth and their retaining surfaces in a given plane 550, arranged on the U-shaped post, retaining surfaces are positioned approximately 120° apart from each other, and provide a relatively balanced support for the retaining element 104. Each tooth 552 may be punched or cut and pressed from the plane of the sheet metal to form the tooth.

In another example of a fastener stud 600 (FIGS. 43-44), the fastener stud includes a planar support portion 602 and a raised support portion 604 supporting a perpendicular-oriented post 504, substantially identical to the post 504 described above with respect to FIGS. 34-42. The post 504 includes all of the structures and functions described with respect to the same post in FIGS. 34-42, and may be used in ways similar to the fastener stud 102 described with respect to FIGS. 2-8.

In another example of a through fastener stud 700 (FIGS. 45-46), the fastener stud 700 includes a support assembly and substantially oppositely disposed posts 504A and 504 B, substantially identical to the post 504 described with respect to FIGS. 34-42. The post 504A and 504 B also includes a support interface 410, substantially identical to the support interface 410 described above. The fastener stud 700 may be used in ways similar to the fastener stud 402 described with respect to FIGS. 19-30.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A fastener stud for a blanket insulation fastener assembly, the fastener stud comprising a monolithic metal fastener stud having a post element, the post element having two side portions spaced apart from each other and each side portion being supported at a support portion by a bridge portion, wherein each side portion extends in a respective side direction away from the bridge portion and includes a plurality of retaining surfaces at edge surfaces of the respective side portion, wherein each retaining surface extends outward of the respective side portion in the respective side direction and wherein each retaining surface of the plurality of retaining surfaces on one side portion has a corresponding retaining surface on the other side portion and wherein the corresponding retaining surface has corresponding surfaces substantially equidistant from a plane perpendicular to an axis of the stud facing the retaining surface and wherein each retaining surface on a side portion is spaced apart from an adjacent retaining surface by a substantially straight surface substantially perpendicular to a portion of the perpendicular plane.

2. The stud of the claim 1 wherein each side portion has the same number of teeth as the other side portion.

3. The stud of claim 1 wherein each retaining surface has a substantially flat surface substantially parallel to a portion of the perpendicular plane.

4. The stud of claim 3 wherein each retaining surface has a ramp surface extending from the substantially flat surface away from the perpendicular plane to the support portion of the side portion.

5. The stud of claim 1 wherein each retaining surface on a side portion is spaced apart from an adjacent retaining surface.

6. The stud of claim 1 wherein the post is a substantially U-shaped post element having a U-shaped post profile and wherein the retaining surfaces are at ends of the U-shaped post profile.

7. The stud of claim 1 wherein the post includes a curved bridge portion.

8. The stud of claim 7 wherein the curved bridge portion is substantially semi-circular.

9. The fastener stud of claim 1 further including a sleeve wherein the sleeve is a resiliently flexible sleeve over part of the fastener stud having a peripheral groove formed in an outside surface of the sleeve between first and second sleeve ends and a plurality of flexible protrusions in the groove extending within the groove.

10. The fastener stud of claim 9 wherein a first sleeve end includes a ramped surface.

11. The fastener stud of claim 9 wherein at least one of the flexible protrusions extends about the grooves in a circumferential direction.

12. The fastener stud of claim 9 wherein at least one of the flexible protrusions includes at least one surface extending in a substantially radial direction.

13. The fastener stud of claim 9 wherein at least one of the flexible protrusions includes at least one surface extending in a direction at an angle to a central axis of the sleeve.

14. The fastener stud of claim 9 wherein the plurality of flexible protrusions includes a first set of protrusions and a second set of protrusions wherein a protrusion in the first set and a protrusion in the second set are at different axial positions on the sleeve relative to each other.

15. The fastener stud of claim 14 wherein a protrusion in the first set is circumferentially offset from a protrusion in the second set.

16. The fastener stud of claim 14 wherein a protrusion in the first set has a slanted surface facing in a first direction and a protrusion in the second set has a slanted surface facing in a second direction different from the first direction.

17. The fastener stud of claim 16 wherein the first and second directions are at least partially opposite each other.

18. The fastener stud of claim 9 wherein first and second flexible protrusions in the plurality of flexible protrusions are positioned substantially diametrically opposite each other.

19. The fastener stud of claim 9 wherein the plurality of flexible protrusions include first, second and third flexible protrusions spaced axially apart from each other, wherein a spacing between the first and second protrusions is different from a spacing between the second and third protrusions.

20. The fastener stud of claim 19 wherein the spacing between the first and second protrusions and the spacing between the second and third protrusions is an axial spacing.

21. A fastener stud for a blanket insulation fastener assembly, the fastener stud comprising a monolithic metal fastener stud having a post element, the post having first and second post elements separated by a non-toothed portion and extending longitudinally in substantially opposite directions, each post element having two side portions spaced apart from each other and each side portion being supported at a support portion by a bridge portion, wherein each side portion includes a plurality of teeth and wherein each tooth in the plurality on one side portion has a corresponding tooth on the other side portion and wherein the corresponding teeth have corresponding surfaces substantially equidistant from a surface of a plane perpendicular to an axis of the post facing the teeth and wherein each tooth in the plurality on a side portion is spaced apart from an adjacent tooth by a substantially straight surface substantially perpendicular to a portion of a plane perpendicular to the axis.

* * * * *